United States Patent
Dave et al.

(10) Patent No.: US 6,594,072 B2
(45) Date of Patent: *Jul. 15, 2003

(54) BIT-RATE AND FORMAT INSENSITIVE ALL-OPTICAL CLOCK EXTRACTION CIRCUIT

(75) Inventors: Bharat Dave, Howell, NJ (US); Doruk Engin, Red Bank, NJ (US); Kwang Kim, Red Bank, NJ (US); Julio Martinez, Oakhurst, NJ (US); Olga Nedzhvetskaya, Eatontown, NJ (US); Jithamithra Sarathy, Atlantic Highlands, NJ (US); Ronald Simprini, Red Bank, NJ (US); Boris Stefanov, Gillette, NJ (US); Tan Buu Thai, Jackson, NJ (US)

(73) Assignee: Alphion Corporation, Eatontown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/195,672

(22) Filed: Jul. 15, 2002

(65) Prior Publication Data

US 2002/0176157 A1 Nov. 28, 2002

Related U.S. Application Data

(62) Division of application No. 09/849,441, filed on May 4, 2001, now Pat. No. 6,563,621.
(60) Provisional application No. 60/238,297, filed on Oct. 6, 2000.

(51) Int. Cl.$^7$ ................................................ H01S 3/00
(52) U.S. Cl. ..................................................... 359/344
(58) Field of Search ....................... 359/344; 372/43–47

(56) References Cited

U.S. PATENT DOCUMENTS

| | | | | |
|---|---|---|---|---|
| 5,661,741 A | * | 8/1997 | Kakimoto | 372/46 |
| 5,920,079 A | * | 7/1999 | Shimizu et al. | 257/18 |
| 6,011,811 A | * | 1/2000 | Ohlander et al. | 372/46 |
| 6,028,875 A | * | 2/2000 | Knight et al. | 372/46 |

* cited by examiner

Primary Examiner—Thomas G. Black
Assistant Examiner—Deandra M. Hughes
(74) Attorney, Agent, or Firm—Kaplan & Gilman, LLP

(57) ABSTRACT

A method and circuit are presented for the all optical recovery of the clock signal from an arbitrary optical data signal. The method involves two stages. A first stage pre-processes the optical signal by converting a NRZ signal to a PRZ signal, or if the input optical signal is RZ, by merely amplifying it. In a preferred embodiment this stage is implemented via an integrated SOA in each arm of an asymmetric interferometric device. The output of the pre-processing stage is fed to a clock recovery stage, which consists of a symmetric interferometer that locks on to the inherent clock signal by using the second stage input signal to trigger two optical sources to self oscillate at the clock rate. In a preferred embodiment the second stage is implemented via SOAs integrated in the arms of an interferometer, with two DFB lasers as terminuses. The output of the interferometer is an optical clock signal at the clock rate of the original input.

2 Claims, 3 Drawing Sheets

BIT-RATE AND FORMAT INSENSITIVE ALL-OPTICAL CLOCK EXTRACTION CIRCUIT

RELATED APPLICATION

This is a divisional application of application Ser. No. 09/849,441, filed May 4, 2001 now U.S. Pat. No. 6,563,621, which claims the benefit of provisional application No. 60/238,297 filed Oct. 6, 2000.

TECHNICAL FIELD

This invention relates to optical communications, and in particular to a method of optical domain clock signal recovery from high-speed data, which is independent of the data format or the optical signal rate.

BACKGROUND OF THE INVENTION

Optical fiber networks are in widespread use due to their ability to support high bandwidth connections. The bandwidth of optical fibers runs into gigabits and even terabits. Optical links can thus carry hundreds of thousands of communications channels multiplexed together.

One of the fundamental requirements of nodal network elements in optical networks is the capability to extract the line rate clock from the incoming signal. Presently, this is achieved by converting the incoming optical signal into an electrical signal followed by clock extraction using an application specific electronic circuit. As optical networks become increasingly transparent, there is a need to recover the line rate clock from the signal without resorting to Optical-to-Electrical, or O-E-O, conversion of the signal.

Future optical networking line systems will incorporate service signals at both 10 Gb/s, 40 Gb/s and much higher data rates, along with the associated Forward Error Corrected (FEC) line rate at each nominal bit rate. The FEC rates associated with, for example, 10 Gb/s optical signal transport include the 64/63 coding for 10 Gb/s Ethernet, the 15/14 encoding of SONET-OC192 FEC, and the strong-FEC rate of 12.25 Gb/s. As these networks tend towards optical transparency, the nodal devices in the optical network must work with any commercially desired line rate, independent of format, whatever that is or may be. Thus, one of the fundamental functions these devices must provide is the capability to extract the clock from an arbitrary optical signal. Moreover, to maintain the high speeds of modern and future data networks, as well as increase efficiency, this clock recovery must be done completely in the optical domain.

In future All Optical Networks (AON) the same network element will need to handle both 10 Gb/s and 40 Gb/s. Consequently, the clock recovery in these network elements must be tunable over a wide range of frequencies.

Previous embodiments of clock recovery systems are experimental in nature, and relegated to research laboratories. They do not include the possibility of recovering the line rate clock from the various ubiquitous NRZ data formats. Additionally, any tuning of the clock signal is done using a linear phase section.

What is therefore needed is an all optical clock recovery system that can operate upon any given optical signal, regardless of its format or bit rate. What is further required is a system that exploits non-linear optical elements to reshape the clock output for optimal retiming of the various data formats.

SUMMARY OF THE INVENTION

A method and circuit are disclosed for the recovery of the clock signal from an arbitrary optical data signal. The method involves two stages. The first stage consists of a Semiconductor Optical Amplifier—Asymmetric Mach-Zehnder Interferometer, or SOA-AMZI, preprocessor, which is responsible for transforming an incoming NRZ type signal into a pseudo return to zero ("PRZ") type signal, which has a significant spectral component at the inherent clock rate.

This preprocessing stage is followed by a second stage clock recovery circuit. In a preferred embodiment the second stage is implemented via an SOA-MZI circuit (symmetric in structure, i.e., no phase delay introduction in one of the arms) terminated by two Distributed Feedback (DFB) lasers that go into mutual oscillations triggered by the dominant frequency of the first stage's output signal. The SOA-MZI is tuned to adjust the input phase of the oscillatory signal into the DFBs. This provides the tuning and control of the oscillation frequency of the output clock signal. The SOA gain currents can be adjusted to reshape the clock signal, which is the output of the second stage.

DETAILED DESCRIPTION OF THE PREFERRED EMBODIMENTS

The above described and other problems in the prior art are solved in accordance with the method, apparatus, circuit and devices of the present invention, as will now be described.

Most, if not all, optical networks currently operating transmit some or all data as NRZ signals. In the case of the NRZ signal format, the RF spectrum reveals no spectral component at the line rate. This is a simple consequence of the format. The RF spectrum of an ideal NRZ signal looks like the mathematical sinc function with the first zero at the line rate.

On the other hand, the RF spectrum of an RZ signal reveals a strong spectral component at the line rate. Consequently, an incoming RZ signal can be operated upon directly to extract the clock signal.

The fundamental problem of all-optical clock recovery from an arbitrary incoming optical signal is thus the passing of an RZ signal without attenuation, and the generation of a RF spectral component at the line rate for a NRZ signal. For an NRZ signal of unknown bit rate and format, an NRZ/PRZ converter is used to generate this latter spectral component by converting the incoming NRZ into a pseudo return to zero, or PRZ signal.

Once the incoming signal has a significant spectral component at the line rate, optical oscillations can be triggered to obtain a pure line rate optical clock signal.

Figure 1:
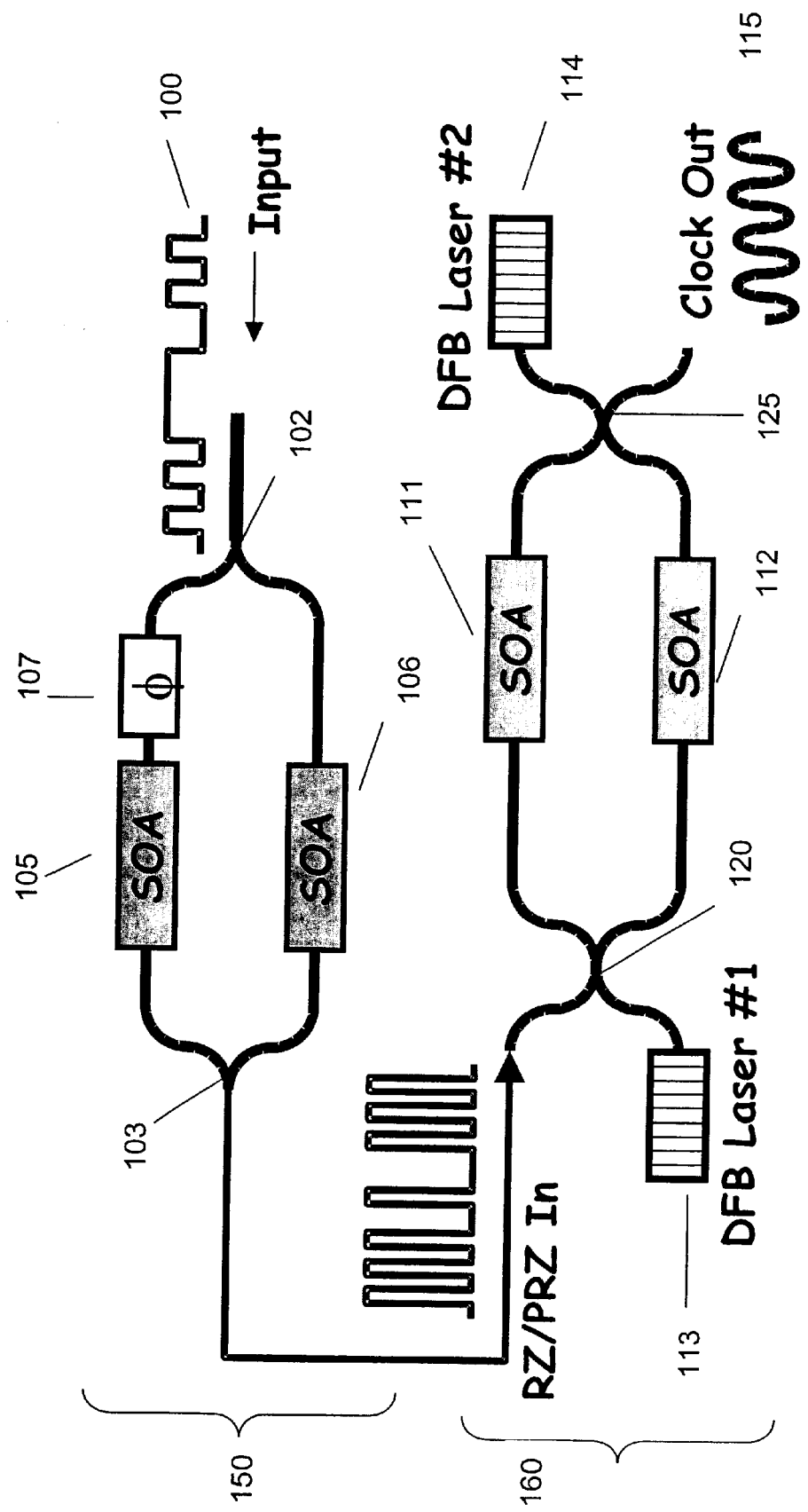
FIG. 1 depicts a circuit implementing the method of the present invention.

FIG. 1 depicts a preferred embodiment of the two circuit stages needed for all optical clock recovery of an arbitrary NRZ signal. For various design considerations, most data in optical data networks is currently sent in the NRZ format. The first stage 150, converts an input signal 100 to PRZ format, where PRZ denotes a "pseudo return to zero" or PRZ data format. The PRZ signal is generated from a standard NRZ format input signal 100 by generating an RZ like pulse each time the NRZ signal transitions, whether from high to low or from low to high, i.e. PRZ has a pulse at each rising edge and at each falling edge of the original signal.

As above, the key property of a PRZ signal is that its RF frequency spectrum has a significant frequency component at the original NRZ signal's clock rate. It is this very property that the method of the invention exploits to recover the clock signal.

The actual conversion of an NRZ signal to the PRZ format is the result of the operation of a PRZ generator 150 on an NRZ input. A related patent application, under common assignment with the present one, describes in detail a method and circuit for implementing the preprocessor of the first stage 150. That patent application is entitled "FORMAT INSENSITIVE AND BIT RATE INDEPENDENT OPTICAL PREPROCESSOR" by Bharat Dave, et al., filed on May 4, 2001. That disclosure is hereby fully incorporated herein by this reference. The method and circuit described therein will thus be summarily described here for purposes of reference.

The PRZ generator forms the first stage 150 of the All Optical Clock Recovery ("AOCR") scheme. This stage consists of a path-delayed Asymmetric Mach-Zehnder Interferometer (AMZI). The AMZI incorporates semiconductor optical amplifiers (SOAs) in each of its arms 105 and 106, respectively, and a phase delay element 107 in one, but not both, of the two arms; hence the asymmetry. The AMZI is set for destructive interference of the signals in the two paths. Thus, the interference of a high bit with its path delayed inverse, i.e. a low bit, generates an RZ-like bit at both the leading and falling edges of the original high bit. This latter signal, with a bit rate effectively double that of the original NRZ bit rate, is the PRZ signal 110.

This effective doubling of the bit rate leads to the generation of a large component of the line rate frequency in the RF spectrum of the output signal 110 of the AMZI 150. Generally, unless the input signal is exceptionally aberrant, this line rate frequency will be the far and away dominant frequency in the spectrum. Since the preprocessor does not need to know the actual bit rate or format of the input data, it is data rate and format insensitive.

Thus the preprocessor has the ability to reshape the PRZ signal as well as adjust its duty cycle. The output 110 of the first stage 150 becomes the input to the second stage 160. In a preferred embodiment, the second stage 160 comprises a symmetric Mach-Zehnder Interferometer, where each arm contains a semiconductor optical amplifier 111 and 112, respectively.

The principle of clock recovery is based on inducing oscillations between the two lasers DFB1 113 and DFB2 114. The oscillations are triggered by the output of the first stage 110. As described above, this output can be either RZ or PRZ. The current to DFB2 114 is tuned close to its lasing threshold, with DFB1 113 energized so as to be in lasing mode. Thus the trigger pulse 110 induces lasing in DFB2 114. The feedback from DFB2 114 turns off the lasing in DFB1 113 resulting in DFB2 114 itself turning off. The reduced feedback from DFB2 114 now returns DFB1 113 to lasing. In this manner the two lasers mutually stimulate one another in oscillation. Recalling that the dominant frequency in the input signal 110 is the original signal's 100 clock rate, pulses from the input 110 are sufficient to lock the oscillation of the DFB lasers at that rate, and, in general, to hold for quite a number of low bits (such as would appear where the original signal 100 had a long run of high bits). Thus, the forced triggering by the PRZ/RZ input 110 locks the phase of the oscillations at the original signal's 100 clock rate.

The interferometer improves the control of the phase input to DFB2 114.

The use of the SOA-MZI facilitates the tuning of the oscillation rate by adjusting the input signal phase into DFB2 114. As the phase of the MZI output is tuned, the gain recovery time of DFB2 114 is adjusted. This results in the oscillation rate being altered. In this manner the clock frequency can be tuned to the desired line rate. Using non-linear SOA elements also allows shaping of the output clock with a lesser energy expenditure. Moreover, by adjusting the currents in each of the two SOAs in the second stage interferometer, the refractive index of each SOA's waveguide can be manipulated, thus altering the phase of the pulse entering DFB2 114. Thus, the oscillation rate of the circuit can be altered, and the identical circuit can be tuned to the various bit rates available in the network, thus rendering the system bit rate independent.

The use of the SOA-AMZI in the first stage 150 of the clock recovery system allows the input power required by the device to be quite nominal, in the embodiment depicted approximately −10 dBm; thus signal pre-amplification concerns are diminished or avoided. The output power of the clock signal in this embodiment is on the order of 0 dBm. The laser wavelength of the all-optical clock signal is a function of the wavelength amplification spectrum of the second stage SOAs. With suitably designed SOAs, the standard carrier frequencies used in optical networks all fall within the SOA amplification spectrum. This wavelength can be anywhere in the amplification window of the SOAs in the second stage 160 SOA-MZI circuit. Thus, as examples, for the C-band of optical transmission a wavelength such as 1550 nm may be chosen, and for the L-band of optical transmission a wavelength such as 1585 nm may be chosen.

In a preferred embodiment, Multimode Interference (MMI) couplers with a 50:50 splitting ratio (commonly known as 3 dB couplers) make up the couplers of the first stage 102 and 103, respectively, as well as the couplers of the second stage 120 and 125, respectively.

Figure 2:
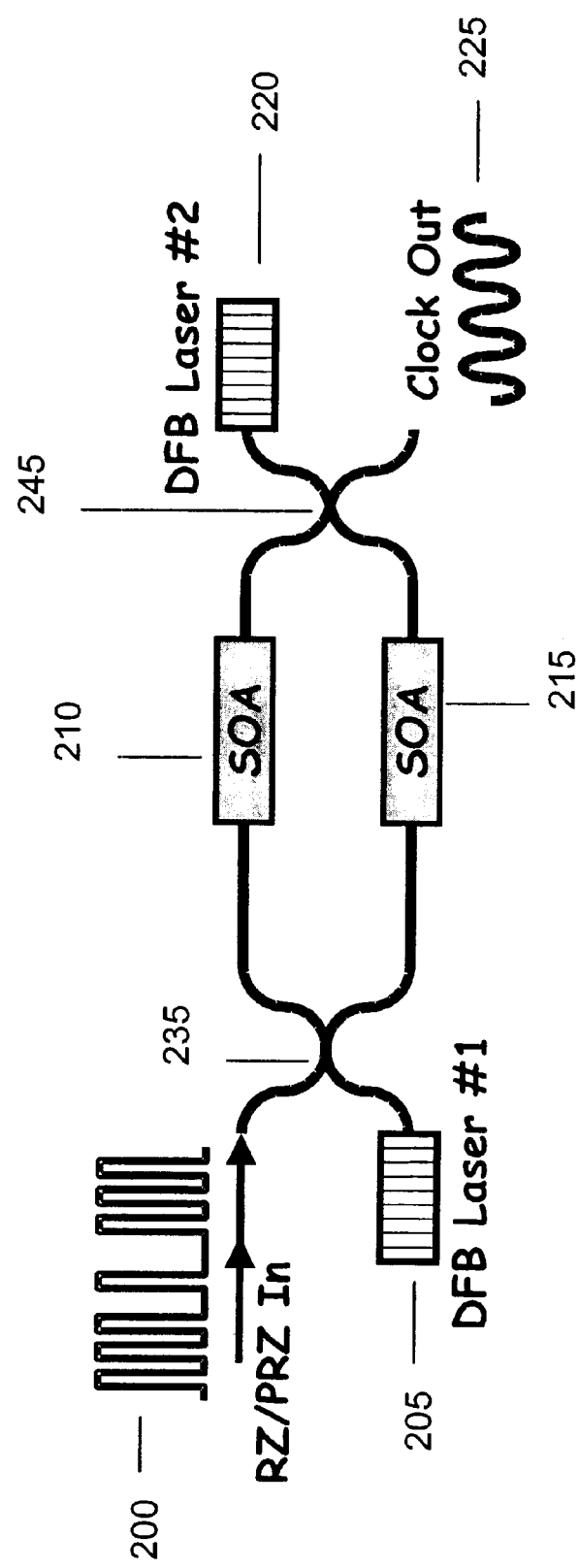
FIG. 2 depicts just the second stage of the circuit of FIG. 1.

FIGS. 2 and 2A show the second stage clock recovery circuit in isolation. The input 200 to this stage, at the top left of the figure, is the amplified RZ or PRZ signal output from the first stage. The stage comprises a symmetric interferometer, with an SOA 210 and 215, respectively, in each arm. The interferometer has two DFB lasers as termini, DFB1 205, in lasing mode, and DFB2 220 near the lasing threshold. This state of affairs results in an optical cavity that is sensitive to the incoming input signal such that self-pulsating behavior will be triggered by any incoming data pulse.

The input signal 200, which has a large, usually far and away dominant, frequency component at the original optical signal's clock rate, thus triggers the DFB lasers 205 and 220 into self pulsating behavior at that frequency, and the feedback between the two lasers results in a pendulum like behavior that maintains the two lasers in a conservative self oscillatory state. This self oscillation is thus maintained for some time, due to the mutual interaction of the lasers, even if the incoming data has numerous "zero" bits in a row (and thus no pulses at all for that interval). Thus the output signal of the second stage 225 is an optical clock signal at the original line rate of the optical input signal 100 in FIG. 1.

In general the clock signal can be "locked" on to after the second stage MZI has been fed ten (10) or more "one" bits from the input signal. As well, due to the conservative mutual feedback and self oscillation of the lasers (which preserve their oscillation rate even in the absence of continually added energy from the RZ/PRZ input signal 110), the output clock signal 225 can be maintained even during significant periods of no second stage input signal 200, such as in the event of 100 "zero" bits, a statistically very rare occurrence, and under some data formats, (where scrambling is done prior to transmission over a link, and descrambling at the receiving end), quite impossible. Thus the mutual feedback and self oscillation of the two lasers presents a robust structure for extracting a clean optical clock signal as its output 225.

The method of the invention can be implemented using either discrete components, or in a preferred embodiment, as an integrated device in InP-based semiconductors. The latter embodiment will next be described with reference to FIG. 3

Figure 3:
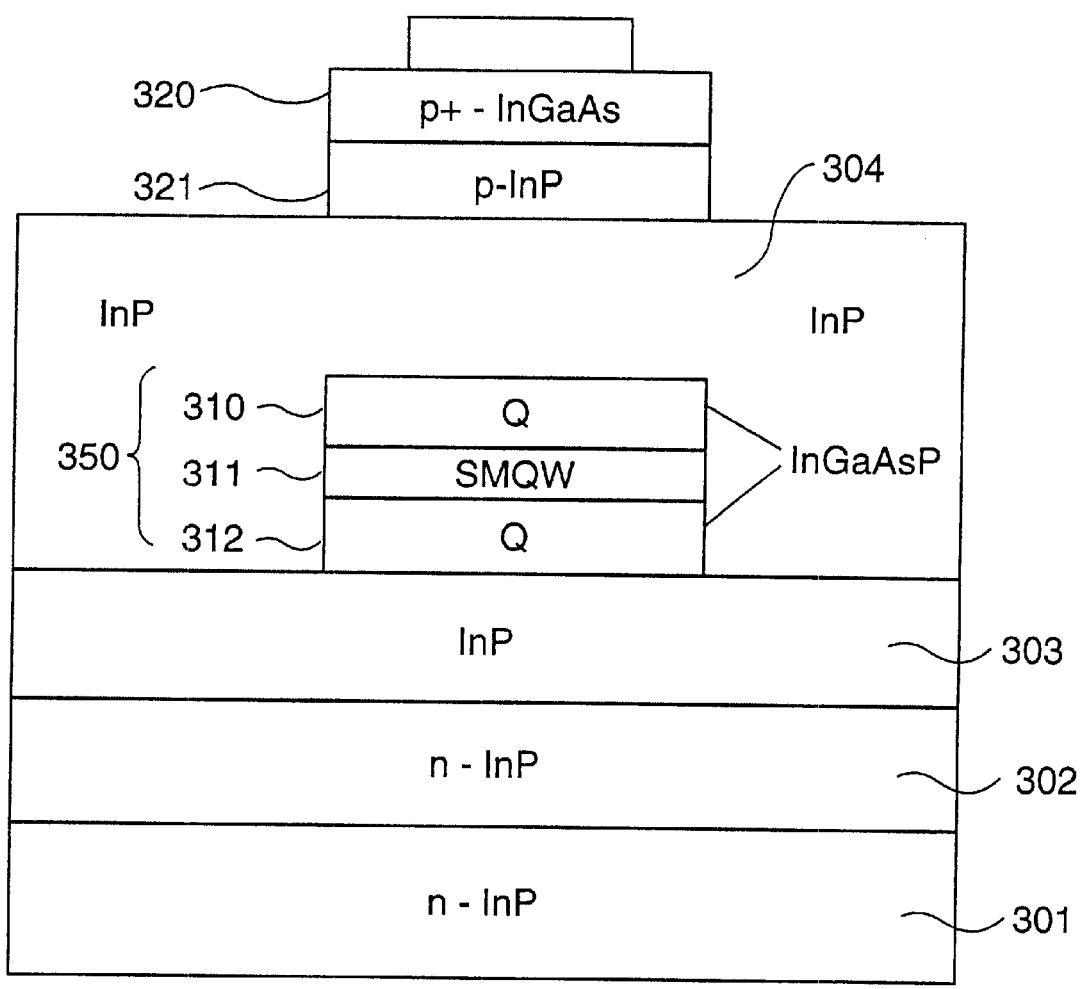
FIG. 3 depicts an exemplary semiconductor optical amplifier device used according to the method of the present invention.

FIG. 3 depicts a cross section of an exemplary integrated circuit SOA. With reference to FIG. 1, FIG. 3 depicts a cross section of any of the depicted SOAs taken perpendicular to the direction of optical signal flow in the interferometer arms. Numerous devices of the type depicted in FIG. 3 can easily be integrated with the interferometers of the preprocessor, so that the entire circuit can be fabricated on one IC. The device consists of a buried sandwich structure 350 with an active Strained Multiple Quantum Well region 311 sandwiched between two waveguide layers 310 and 312 made of InGaAsP. In an exemplary embodiment, the $\lambda_g$ of the InGaAsP in layers 310 and 312 is 1.17 $\mu$m. The sandwich structure does not extend laterally along the width of the device, but rather is also surrounded on each side by the InP region 304 in which it is buried.

The active Strained MQW layer is used to insure a constant gain and phase characteristic for the SOA, independent of the polarization of the input signal polarization. The SMQW layer is made up of pairs of InGaAsP and InGaAs layers, one disposed on top of the other such that there is strain between layer interfaces, as is known in the art. In a preferred embodiment, there are three such pairs, for a total of six layers. The active region/waveguide sandwich structure 350 is buried in an undoped InP layer 304, and is laterally disposed above an undoped InP layer 303. This latter layer 303 is laterally disposed above an n-type InP layer 302 which is grown on top of a substantially doped n-type InP substrate. The substrate layer 301 has, in a preferred embodiment, a doping of $4$–$6 \times 10^{18}/cm^{-3}$. The doping of the grown layer 302 is precisely controlled, and in a preferred embodiment is on the order of $5 \times 10^{18}/cm^{-3}$. On top of the buried active region/waveguide sandwich structure 350 and the undoped InP layer covering it 304 is a laterally disposed p-type InP region 321. In a preferred embodiment this region will have a doping of $5 \times 10^{17}/cm^{-3}$. On top of the p-type InP region 321 is a highly doped p+-type InGaAs layer. In a preferred embodiment this latter region will have a doping of $1 \times 10^{19}/cm^{-3}$. The p-type layers 320 and 321, respectively, have a width equal to that of the active region/waveguide sandwich structure, as shown in FIG. 3.

As described above, the optical signal path is perpendicular to and heading into the plane of FIG. 3.

Utilizing the SOA described above, the entire all-optical clock recovery device can be integrated in one circuit. An exemplary method of effecting this integration is next described.

After an epiwafer is grown with the waveguide and the SOA active regions, the wafer is patterned to delineate the SOAs, the AMZI and the MZI. In a preferred embodiment the path length difference between the two arms of the AMZI is approximately 1 mm.

Next, the DFB regions of the second stage of the device are created using either a holographic or a non-contact interference lithographic technique. The periodicity of the grating in a preferred embodiment is approximately 2850A. The grating is of Order 1 and provides optical feedback through second-order diffraction. The undoped InP top cladding layer, the p-type InP layers, and the contact layer are then regrown on the patterned substrate. This step is then followed by photolithography for top-contact metallization. The device is then cleaved and packaged.

While the above describes the preferred embodiments of the invention, various modifications or additions will be apparent to those of skill in the art. Such modifications and additions are intended to be covered by the following claims.

What is claimed:

1. A semiconductor device comprising:

an InP substrate of a first doping type;

a second InP layer of the first doping type disposed upon it;

a third InP layer not doped disposed upon said second layer;

a first InGaAsP waveguide region laterally disposed on top of said third InP layer, whose width is less than that of the substrate, first and second InP layers;

an active strained multiple quantum well ("SMQW") region laterally disposed and centered on top of said first waveguide region, having the same width as said first waveguide region;

a second InGaAsP waveguide region laterally disposed on top of said SMQW layer, having the same width as said first waveguide region and as said SMQW region;

a fourth InP layer, undoped, disposed upon said second waveguide region, and extending downward, in the direction of the substrate, along the sides of said active region and said first waveguide region, whose width is equal to that of the substrate, and the first and second InP layers;

a first InP layer of a second doping type, laterally disposed above said fourth InP layer, having the same width as said first waveguide region and as said SMQW region;

a second InP layer of the second doping type, laterally disposed above said first InP layer of the second doping type, having the same width as said first InP layer of the second doping type;

a contact layer laterally disposed above said second InP layer of the second doping type; and a metal electrode disposed above said contact layer.

2. An integrated optical circuit comprising the semiconductor device of claim 1.

* * * * *